United States Patent
Jain et al.

(10) Patent No.: US 9,443,196 B1
(45) Date of Patent: Sep. 13, 2016

(54) METHOD AND APPARATUS FOR PROBLEM ANALYSIS USING A CAUSAL MAP

(71) Applicant: EMC Corporation, Hopkinton, MA (US)

(72) Inventors: Manoj Kumar Jain, Bangalore (IN); Vivekananda Venkateswaran, Bangalore (IN)

(73) Assignee: EMC Corporation, Hopkinton, MA (US)

( * ) Notice: Subject to any disclaimer, the term of this patent is extended or adjusted under 35 U.S.C. 154(b) by 283 days.

(21) Appl. No.: 14/041,317

(22) Filed: Sep. 30, 2013

(51) Int. Cl.
*G06N 5/04* (2006.01)

(52) U.S. Cl.
CPC ..................................... *G06N 5/048* (2013.01)

(58) Field of Classification Search
CPC ....................................................... G06N 5/04
See application file for complete search history.

(56) References Cited

PUBLICATIONS

T. Han et al., "A Universal Fault Diagnostic Expert System Based on Bayesian Network", 2008 IEEE Conf. on Comp. Sci. and Software Eng., pp. 260-63.*
M. Wiboonrat, "An Empirical Study on Data Center System Failure Diagnosis", Proc. IEEE Third Int'l Conf. on Internet Monitoring and Protection, 2008, pp. 103-08.*
J. Keronen, "An Expert System Prototype for Event Diagnosis and Real-Time Operation Planning in Power System Control", Power Systems, IEEE Transactions on 4.2, 1989, pp. 544-50.*
R. Xu and D. Wunsch, "Survey of Clustering Algorithms", IEEE Trans. on Neural Networks, vol. 16, No. 3, May 2005.*

* cited by examiner

*Primary Examiner* — Kakali Chaki
*Assistant Examiner* — Vincent Gonzales
(74) *Attorney, Agent, or Firm* — Krishnendu Gupta; Robert Kevin Perkins; Gerald P. Kazanjian (57) ABSTRACT

Example embodiments of the present invention provide a method and an apparatus for problem analysis using a causal map. The method includes building a problem domain corresponding to a datacenter management problem and building a causal map corresponding to the problem domain. A causal event of the datacenter management problem then may be inferred according to the causal map.

15 Claims, 7 Drawing Sheets

METHOD AND APPARATUS FOR PROBLEM ANALYSIS USING A CAUSAL MAP

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This application relates to root cause analysis.

BACKGROUND

Data center outages are costly. According to a recent study, an outage can cost an organization an average of approximately $5,000 per minute. Therefore, it is important to quickly troubleshoot, analyze, and fix IT issues.

SUMMARY

Example embodiments of the present invention provide a method and an apparatus for problem analysis using a causal map. The method includes building a problem domain corresponding to a datacenter management problem and building a causal map corresponding to the problem domain. A causal event of the datacenter management problem then may be inferred according to the causal map.

BRIEF DESCRIPTION OF THE DRAWINGS

The above and further advantages of the present invention may be better under stood by referring to the following description taken into conjunction with the accompanying drawings in which.

DETAILED DESCRIPTION

Datacenter convergence is evolving as virtualized and geographically distributed infrastructures breaking technology silos. As complexity of datacenter is growing, it is increasingly important to correlate disparate events across IT infrastructure and quickly troubleshoot, analyze, and fix IT issues. Traditional model driven root cause analysis techniques (e.g. Codebook Correlation in Smarts by EMC Corporation of Hopkinton, Mass.) identify the root cause of the problem but are limited to predefined causality criteria in the model (i.e., all problems must be known up front in order to be modeled). The problems in datacenter are typically manifest due to several issues beyond causality model and so do not isolate the real cause of problem. Thus, the resolution process typically starts with manual investigation of the problem by gathering additional information and inferring the possible root of the problem.

However, this process is inefficient and mostly depends on the skills of the troubleshooter. Prior solutions may include compute-intensive modeling and inference techniques to perform automatic recognition by looking at logs of past several days, categorizing operational problems by collecting and analyzing metrics using machine learning and classification, identifying unusual or noteworthy sequences of events that might be indicators of unexpected behavior, and instrumenting the system and creating libraries of possible faults and their consequences. It should be understood that most of these traditional techniques require many prerequisite and may be complex to adopt.

Example embodiments of the present invention overcome these and other shortcomings by providing a method and an apparatus for an inference driven causality map to identify the root of the problem. A causal map is a structure problem analysis process to identify the underlying reason or reasons causing a problem and is built by collecting the contributory events and reconstructing the sequence of events leading up to the problem. Example embodiments of the present invention provide several advantages over traditional solutions, including providing an intuitive visual causal map which helps the user to understand the sequence of events attributed to the problem, correlating disparate events across IT infrastructure to quickly troubleshoot, analyze, and fix IT issues, and providing a simplified structured problem analysis approach.

Accordingly, example embodiments of the present invention build a cause and effect inference by classifying and clustering the "likelihood of related" notifications of managed entities from distributed domain managers and construct causal map of a problem. Example embodiments of the present invention recognize that (1) causality requires the antecedent to precede or coincide with the consequence in time (i.e., an event or circumstance occurs before a problem originates) and (2) the inference is a conclusion that is rationally and logically made based on the given facts or circumstances (i.e., the conclusion is based on and supported by facts and cannot be generalized).

Figure 1:
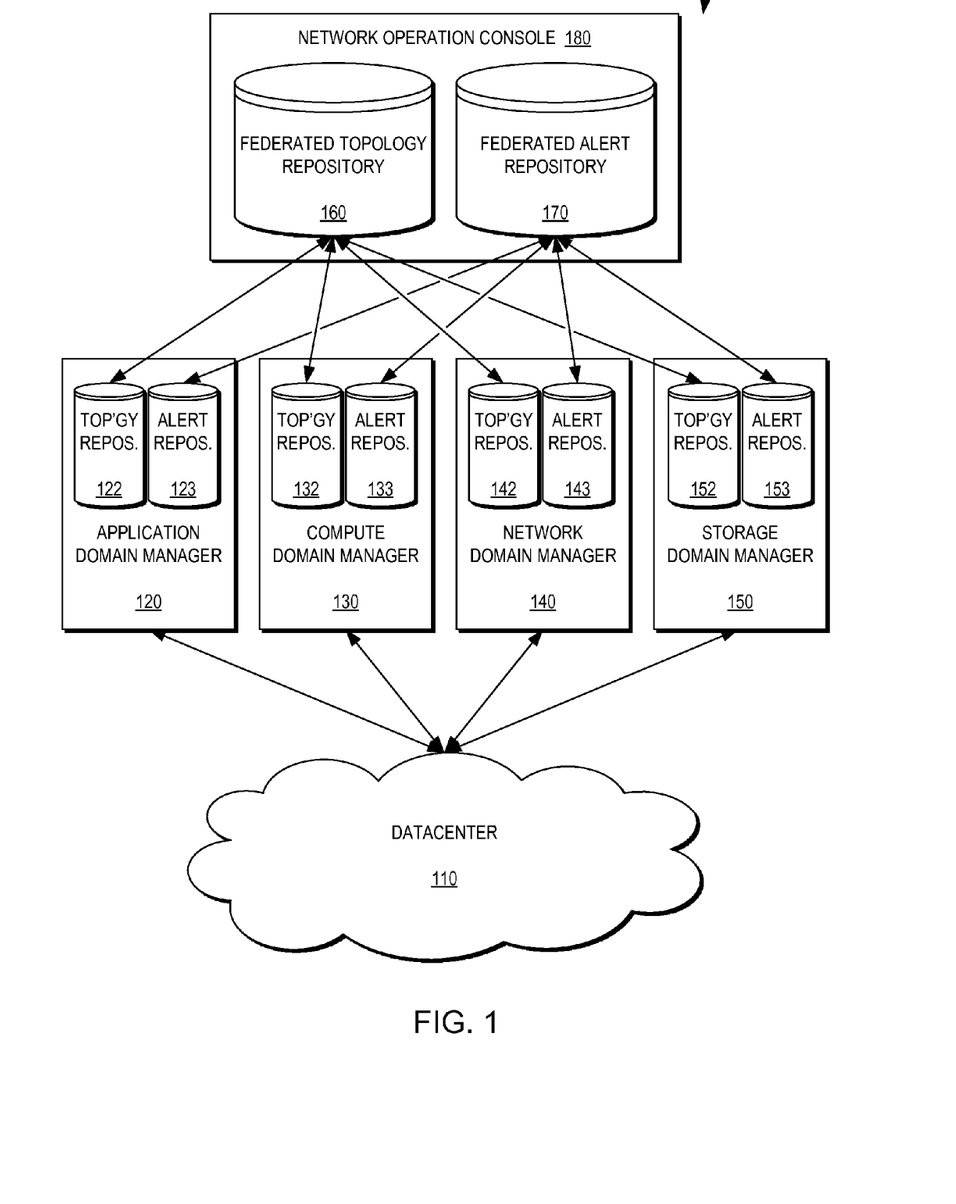
FIG. 1 is a block diagram of a network including a network operation console according to an example embodiment of the present invention.

FIG. 1 is a block diagram of a network 100 including a network operation console 180 according to an example embodiment of the present invention. As illustrated in FIG. 1, the network operation console 180 may communicate with a plurality of domain managers (e.g., application domain manager 120, compute domain manager 130, network domain manager 140, and storage domain manager 150) within the datacenter 100. In certain embodiments, the domain managers 120, 130, 140, 150 may be respective management server configured to manage respective aspect of a datacenter 110 (e.g. application, compute, network, and storage).

The datacenter 110 may have a complex topology of interconnected devices hosting critical business applications and services. Therefore, each domain manager 120, 130, 140, 150 may have its own topology/monitoring and alerting (i.e., the application domain manager 120 may have a topology repository 122 related to the application domain of the datacenter 110 and an alert repository 123 related to the application domain of the datacenter, the compute domain manager 130 may have a topology repository 132 related to the compute domain of the datacenter 110 and an alert repository 133 related to the compute domain of the datacenter, the network domain manager 140 may have a topology repository 142 related to the network domain of the datacenter 110 and an alert repository 143 related to the network domain of the datacenter, and the storage domain manager 150 may have a topology repository 152 related to the storage domain of the datacenter 110 and an alert repository 153 related to the storage domain of the datacenter).

It should be understood that the domain manager topology repositories 122, 132, 142, 152 store object related to entities and their interconnected information and the domain manager alert repositories 123, 133, 143, 153 store alerts objects related to, for example, important events corresponding to entities. Further, it should be understood that, in certain embodiments, each domain manager 120, 130, 140, 150 may have a topology discovery module, a monitoring and analysis module, and an eventing module, and also exposes APIs to access the topology and alert repositories.

As illustrated in FIG. 1, the network operation console 180 also may include a federated topology repository 160 providing pointers to corresponding topology objects in each respective topology repository 122, 132, 142, 152 and a federated alert repository 170 providing pointers to corresponding alert objects in each respective alert repository 123, 133, 143, 153. It should be understood that, in example embodiments of the present invention, the federated repositories 160, 170 reference, rather than copy, the objects from the respective domain manager repositories 122, 123, 132, 133, 142, 143, 152, 153.

Figure 2:
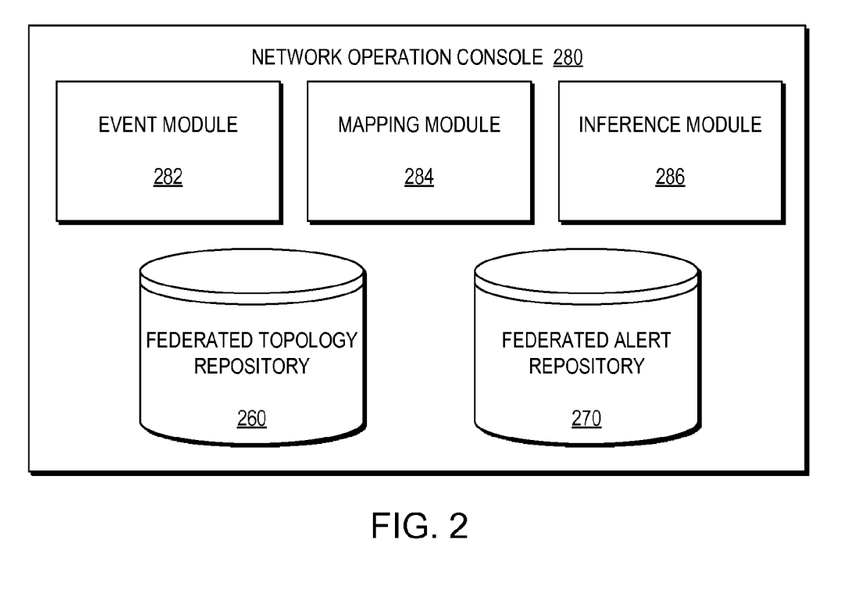
FIG. 2 is a block diagram of a network operation console according to an example embodiment of the present invention.

FIG. 2 is a block diagram of a network operation console 280 according to an example embodiment of the present invention. As illustrated in FIG. 2, the network operation console 280 includes a event module 282, a mapping module 284, an inference module 286, a federated topology repository 260 and a federated alert repository 270. As described above with respect to FIG. 1, the federated topology repository 260 may provide pointers to corresponding topology objects in each respective topology repository (e.g., 122, 132, 142, 152 of FIG. 1) and the federated alert repository 270 may provide pointers to corresponding alert objects in each respective alert repository (e.g., 123, 133, 143, 153 of FIG. 1).

Figure 3:
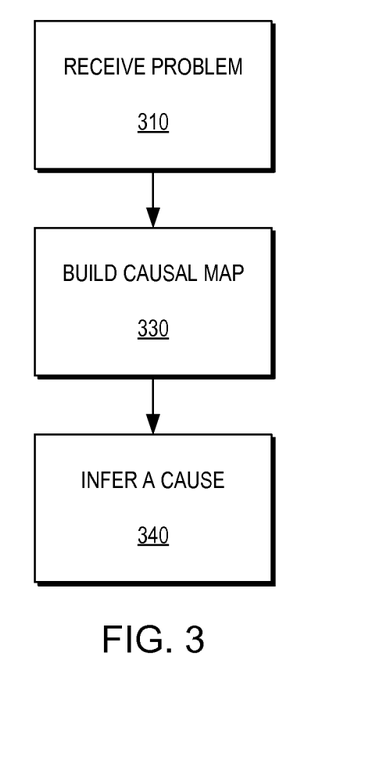
FIGS. 3 and 4 are flow diagrams of methods according to example embodiments of the present invention.

FIG. 2 may be studied in conjunction with FIG. 3 which is a flow diagram illustrating a method according to an example embodiment of the present invention. As illustrated in FIG. 2, the event module 282 may receive a notification from a domain manger (e.g., application domain manager 120, compute domain manager 130, network domain manager 140, or storage domain manager 150 of FIG. 1) of a problem in the datacenter 110 triggering root cause analysis (310). It should be understood that the problem may be related to a fault, configuration, audit, performance, security (FCAPS) or any other condition in the data center 110 for which root cause analysis is beneficial. The mapping module 284 then may build a causal map (330), such as by building a problem domain corresponding to the problem, as will be described in greater detail below with respect to the flow diagram of FIG. 4. The inference module 286 then may infer a cause of the datacenter management problem according to the causal map.

Figure 4:
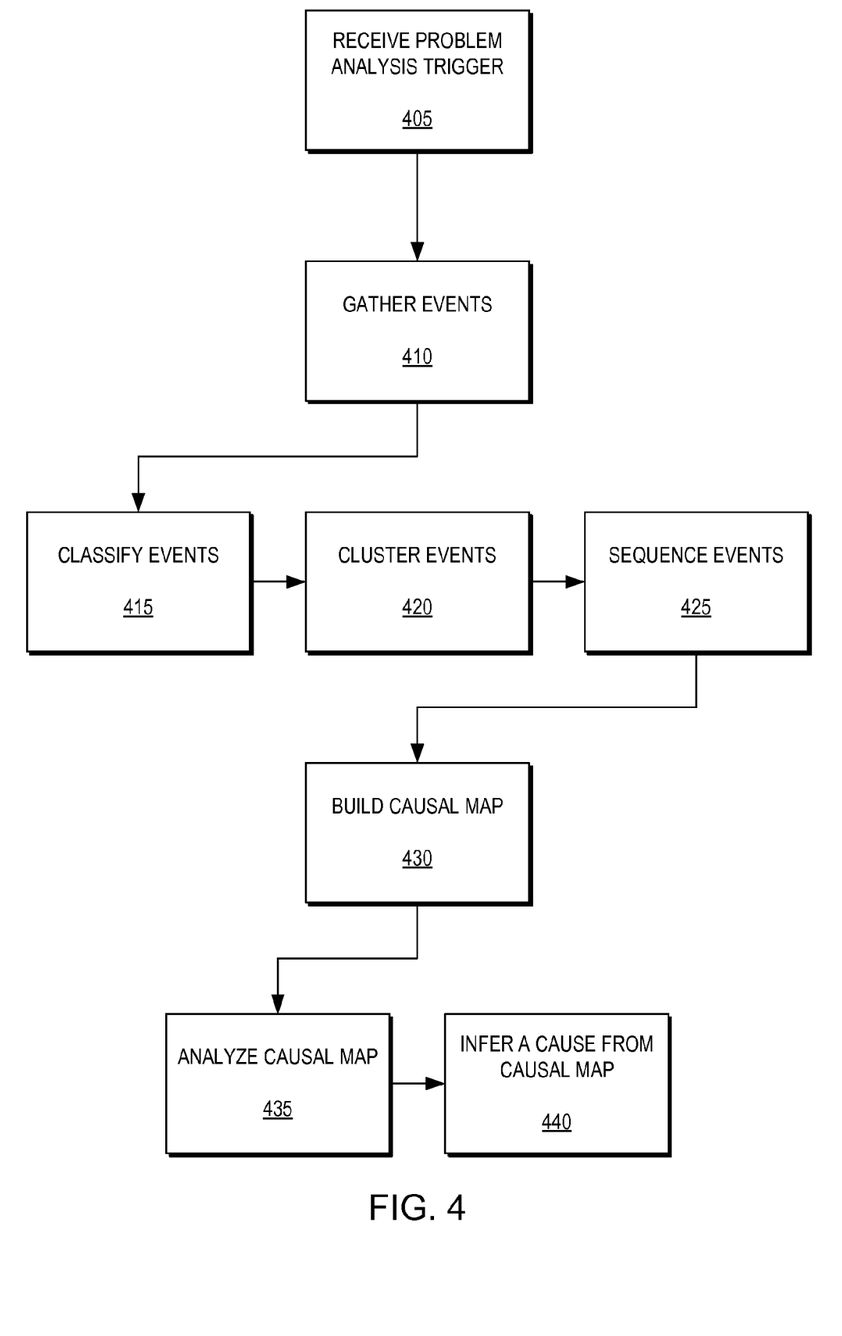

FIG. 4 is a flow diagram illustrating a method according to an example embodiment of the present invention. As illustrated in FIGS. 2 and 4, when a domain manager (e.g., 120, 130, 140, 150 of FIG. 1) notifies the network operation console 280 of a datacenter management problem, the event module 282 receives the problem notification as a trigger (405) to prompt, the problem analysis process of example embodiments of the present invention (405).

To build a causal map, the event module 282, according to an example embodiment of the present invention, first determines a problem domain for the datacenter management problem for which the event module 282 was notified (410). A problem domain is a set of datacenter topology entities which likely are to be related to or may contribute to a cause of the datacenter management problem.

In certain embodiments, building the problem domain is a two phase process. In the first phase, the event module 282 builds a local problem domain by mapping the datacenter management problem to an originating domain manager and collecting symptoms of the datacenter management problem from the topology repository of the domain manager that reported the datacenter management problem (e.g., application domain manager 120, compute domain manager 130, network domain manager 140, or storage domain manager 150) (410). Accordingly, the event module 282 may determine the domain (i.e., application, compute, network, or storage) within the datacenter 110 which experienced the problem and may build the local problem domain by extracting the topology of active symptoms.

The second phase, recognizes that the domain that experienced the problem (i.e., the local problem domain) may not be the domain in which the datacenter management problem occurred. Accordingly, in example embodiments of the present invention, the event module 282 may expand the local problem domain into an extended problem domain by analyzing the local problem domain (415) and inferring from the topology repository of the domains other than the local problem domain symptoms of the datacenter management problem (420). In other words, the event module 220 may determine the "likely of related" notifications from foreign domain managers 200. Accordingly, the event module 282 may gather all the events corresponding to the extended problem domain, such as by retrieving topology information from the federated topology repository 260 or from the individual topology repositories 122, 132, 142, 152 of each respective domain manager (425).

For example, referring to FIG. 1, if the datacenter management problem is detected by the application domain manager 120, the application domain manager 120 may notify the network operation console 180. The event module 282 then may determine the local problem domain in the application domain according to the application domain topology repository 122 and may determine the extended problem domain according to the other domain topology repositories 132, 142, 152. Once the extended problem domain is built, the event module 282 may gather alerts corresponding to extended problem domain from the respective alert repositories 123, 133, 143, 153.

Figure 5:
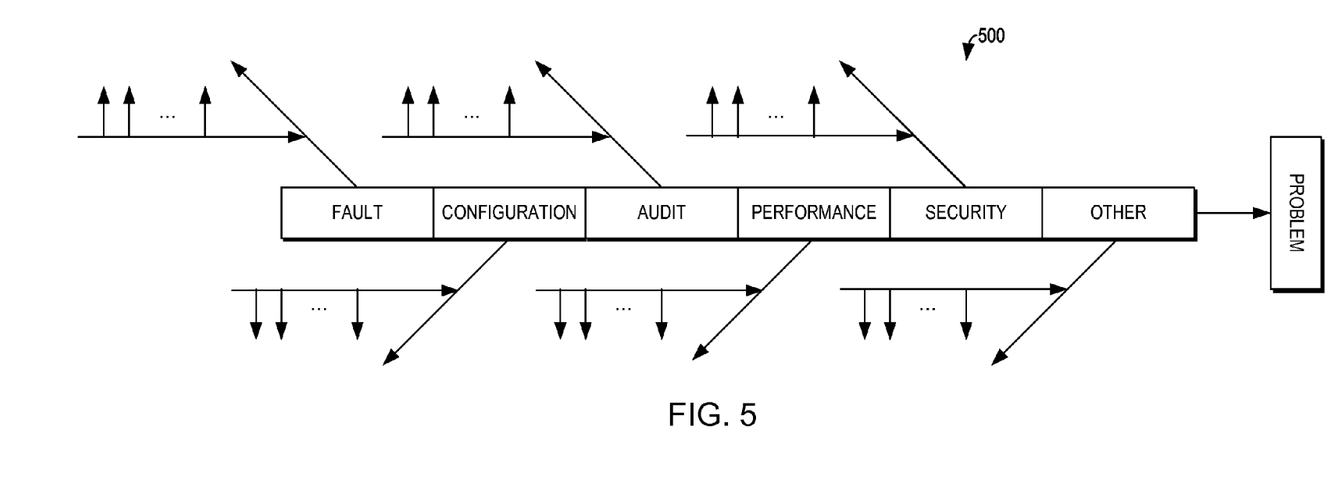
FIG. 5 is a modified Ishikawa diagram of a causal map according to an example embodiment of the present invention.

FIG. 4 also may be studied in conjunction with FIG. 5 which is a modified Ishikawa diagram of a causal map according to an example embodiment of the present invention. The events gathered by the event module 282 may be sequenced by the mapping module 284 (430) by organizing the events in chronological order to allow for determination of events or circumstances occurring prior to the datacenter management problem. In a final analysis phase, the mapping module 284 then may build a causal map of the problem by categorizing the events (435). For example, the mapping module 284 may build the causal map 500 by organizing the events relative to the datacenter management problem by categorizing the events under respective planes.

It should be understood that, in any datacenter, there may be several alerts corresponding to a problem. Accordingly, to identify what is causing the problem, in a preferred embodiment, the event must be organized in such a way that they can point to real cause of problem (i.e., certain types of events have higher probability of causing the problem than others). In certain embodiments, the events may be categorized by precedence probability (e.g., FCAPS):

| Category | Type of failure | Analysis |
|---|---|---|
| Fault | Power, Device, Physical etc . . . | Very high precedence probability event causing the problem |
| Configuration | Software, IOS upgrade, user actions etc . . . | High precedence probability event causing the problem |
| Audit | Capacity, Usage etc . . . | Medium precedence probability event causing the problem |
| Performance | Response time, RTT, Delay etc... | Low precedence probability event, these events are generally manifest of higher level problem |
| Security | Access control, Attack, Policies etc . . . | Low precedence probability event, these events are generally manifest of higher level problem |
| Others | Natural calamity, Fire etc . . . | Low precedence probability event |

The inference module 286 then may analyze the causal map 500 (440) to determine the most precedent event on the causal map. In other words, as events are related and manifest to the datacenter management problem, example embodiments of the present invention can conclude that left-most events with the highest probability on the causal map 500 may be root of the datacenter management problem. Thus, the inference module 240 may infer a causal event among the gathered events is a cause of the datacenter management problem (445).

For example, Netflix® streaming was impacted by problems in the Amazon® Web Services (AWS) Elastic Load Balancer (ELB) service that routes network traffic to the Netflix services supporting streaming. The problems at AWS caused a partial Netflix streaming outage that started at around 12:30 PM PST on December 24 and grew in scope later that afternoon. Initially, the Amazon support team pursued API errors before learning that the root cause of the outage was actually a configuration issue caused by human error. In this example, a service outage was preceded by performance degradation which was preceded by configuration change. Further, GoDaddy.com customers experienced intermittent outages on Sep. 10, 2012 that lasted for several hours. Initially, the GoDaddy.com support team suspected a hacker attack and later learned that the root cause of the outage was actually due to reduced redundancy in their DNS service. Accordingly, the routing tables on core router grew in size and pushed the core routers beyond their capabilities. A causal map according to an example embodiment of the present invention, such as that shown in FIG. 5, clearly would have pointed to a configuration error as root of these problems.

Figure 6:
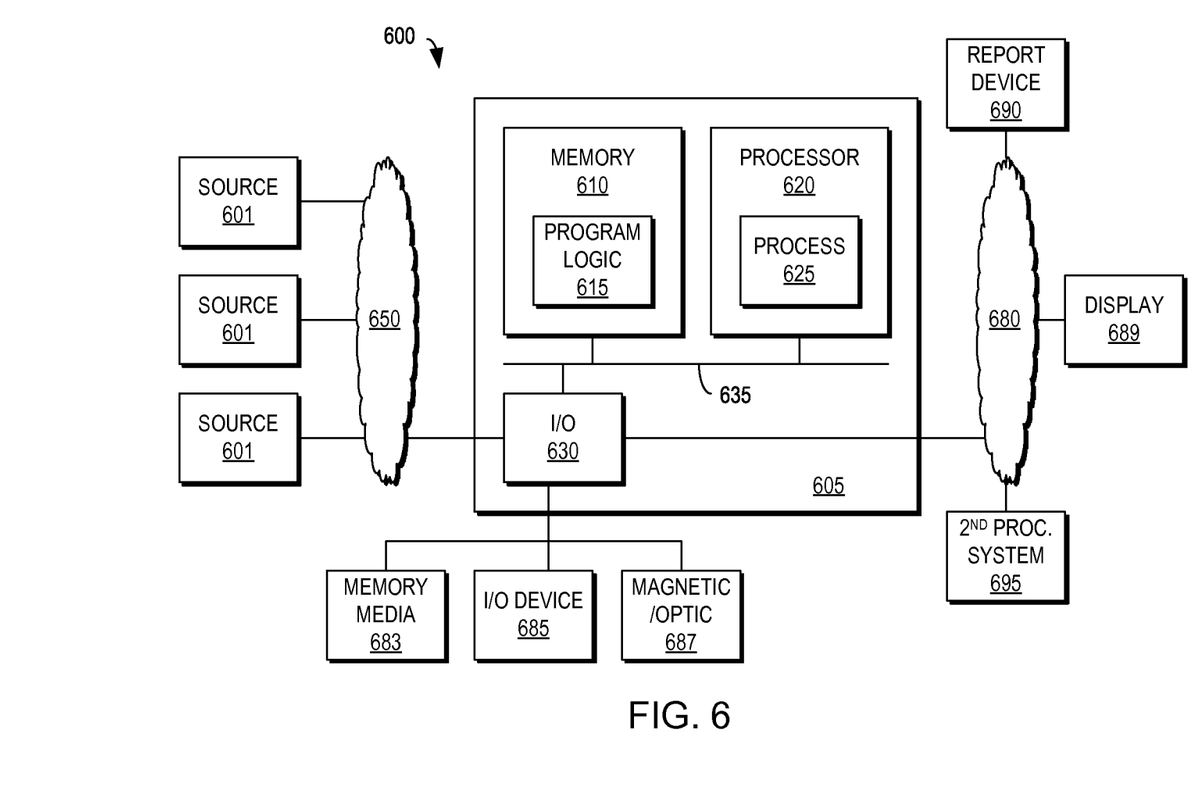
FIG. 6 is a block diagram of an apparatus according to an example embodiment of the present invention.

FIG. 6 is a block diagram of an example embodiment apparatus 605 according to the present invention. The apparatus 605 may be part of a system 600 and includes memory 610 storing program logic 615, a processor 620 for executing a process 625, and a communications I/O interface 630, connected via a bus 635.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 6, the machine becomes an apparatus for practicing the invention. When implemented on one or more general-purpose processors, the program code combines with such a processor to provide a unique apparatus that operates analogously to specific logic circuits. As such, a general purpose digital machine can be transformed into a special purpose digital machine.

Figure 7:
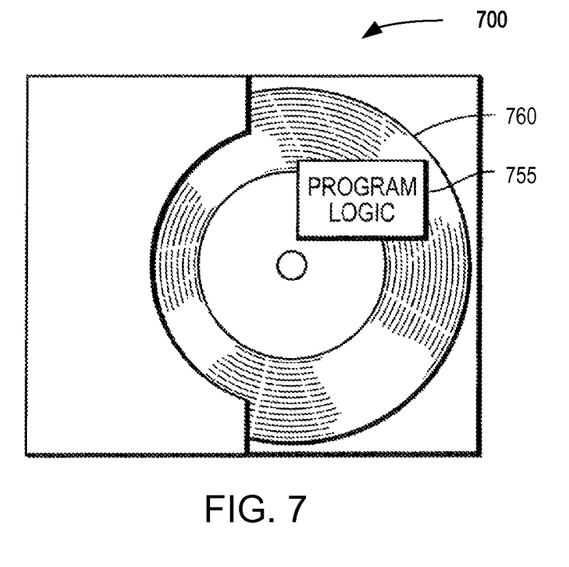
FIG. 7 is an illustration of an example embodiment of the present invention embodied as a computer program product.

FIG. 7 shows program logic 755 embodied on a computer-readable medium 760 as shown, and wherein the logic 755 is encoded in computer-executable code configured for carrying out the methods of this invention, thereby forming a computer program product 700.

The logic for carrying out the method may be embodied as part of the aforementioned system, which is useful for carrying out a method described with reference to embodiments shown. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A method comprising:
   receiving, at a network operation console in a datacenter, notification of a datacenter problem, the datacenter having a complex federated topology of interconnected devices hosting applications and services;
   retrieving topology information, relating to datacenter entities associated with the datacenter management problem, from a plurality of topology repositories in the datacenter storing objects related to entities in a plurality of datacenter domains including application, compute, network, and storage domains, and their interconnect information;
   building a problem domain defined by a set of datacenter topology entities likely to be related or contributory to a cause of the datacenter management problem;
   categorizing events from the domains according to a precedence probability of a plurality of planes defined by categories including fault, configuration, audit, performance, security, and others having respective relative degrees of probability of occurring in the datacenter;
   building a causal map corresponding to the problem domain according to the events categorized under respective planes;
   analyzing the causal map to determine a most precedent event on the causal map of the events categorized under the respective planes according to the precedence probability;
   inferring a causal event of the datacenter management problem according to the most precedent event as determined by the analysis of the causal map; and
   resolving the datacenter problem according to the inferred causal event of the datacenter management problem as determined by the most precedent event to affect operation of the datacenter.

2. The method of claim 1 further comprising extending the problem domain by inferring, from domains in the datacenter other than the problem domain, other datacenter entities associated with the datacenter management problem.

3. The method of claim 2 further comprising:
retrieving from the extended problem domain events corresponding to the datacenter entities associated with the datacenter management problem and the other datacenter entities associated with the datacenter management problem; and
organizing the events in chronological order.

4. The method of claim 1 wherein building a problem domain corresponding to a datacenter management problem comprises retrieving events from the problem domain.

5. The method of claim 4 further comprising retrieving events from an extended problem domain.

6. The method of claim 5 further comprising:
classifying the retrieved events related to the datacenter management problem;
clustering the classified events related to the datacenter management problem; and
sequencing the clustered events related to the datacenter management problem.

7. The method of claim 6 further comprising gathering topology and alert information from a plurality of domain managers in the datacenter.

8. A network operation console in a datacenter having a complex federated topology of interconnected devices hosting applications and services, the network operation console comprising:
an event module configured to receive notification of a datacenter problem, retrieve topology information, relating to datacenter entities associated with the datacenter management problem, from a plurality of topology repositories in the datacenter storing objects related to entities in a plurality of datacenter domains including application, commute, network, and storage domains, and their interconnect information, build a problem domain defined by a set of datacenter topology entities likely to be related or contributory to a cause of the datacenter management problem;
a mapping module configured to categorize events from the domains according to a precedence probability defined by categories including fault, configuration, audit, performance, security, and others having respective relative degrees of probability of occurring in the datacenter, build a causal map corresponding to the problem domain according to the events categorized under respective planes; and
an inference module configured to analyze the causal map to determine a most precedent event on the causal map of the events categorized under the respective planes according to the precedence probability, inferr a causal event of the datacenter management problem according to the most precedent event as determined by the analysis of the causal map, and resolve the datacenter problem according to the inferred causal event of the datacenter management problem as determined by the most precedent event to affect operation of the datacenter.

9. The apparatus of claim 8 wherein the event module is further configured to extend the problem domain by inferring, from domain managers in the datacenter other than the domain manager managing the problem domain, other datacenter entities associated with the datacenter management problem.

10. The apparatus of claim 9 wherein the event module is further configured to retrieve from the extended problem domain events corresponding to the datacenter entities associated with the datacenter management problem and the other datacenter entities associated with the datacenter management problem and organize the events in chronological order.

11. The apparatus of claim 8 wherein the event module is further configured to retrieve events from the problem domain.

12. The apparatus of claim 11 wherein the event module is further configured to retrieve events from an extended problem domain.

13. The apparatus of claim 12 wherein the mapping module is further configured to classify the retrieved events related to the datacenter management problem, cluster the classified events related to the datacenter management problem, and sequence the clustered events related to the datacenter management problem.

14. The apparatus of claim 13 wherein the event module is further configured to gather topology and alert information from a plurality of domain managers in the datacenter.

15. A computer program product including a nontransitory computer readable storage medium storing computer program code thereon comprising:
computer program code for receiving, at a network operation console in a datacenter, notification of a datacenter problem, the datacenter having a complex federated topology of interconnected devices hosting applications and services;
computer program code for retrieving topology information, relating to datacenter entities associated with the datacenter management problem, from a plurality of topology repositories in the datacenter storing objects related to entities in a plurality of datacenter domains including application, compute, network, and storage domains, and their interconnect information;
computer program code for building a problem domain defined by a set of datacenter topology entities likely to be related or contributory to a cause of the datacenter management problem;
computer program code for categorizing events from the domains according to a precedence probability of a plurality of planes defined by categories including fault, configuration, audit, performance, security, and others having respective relative degrees of probability of occurring in the datacenter;
computer program code for building a causal map corresponding to the problem domain according to the events categorized under respective planes;
computer program code for analyzing the causal map to determine a most precedent event on the causal map of the events categorized under the respective planes according to the precedence probability;
computer program code for inferring a causal event of the datacenter management problem according to the most precedent event as determined by the analysis of the causal map; and
computer program code for resolving the datacenter problem according to the inferred causal event of the datacenter management problem as determined by the most precedent event to affect operation of the datacenter.

* * * * *